United States Patent
Hatano et al.

(10) Patent No.: US 10,807,666 B2
(45) Date of Patent: Oct. 20, 2020

(54) FIBER REINFORCED RESIN MATERIAL PLATE-SHAPED MEMBER

(71) Applicants: Suzuki Motor Corporation, Shizuoka (JP); Teijin Limited, Osaka (JP)

(72) Inventors: Daisuke Hatano, Shizuoka (JP); Takahisa Egawa, Shizuoka (JP); Masahiro Kitagawa, Osaka (JP); Masatomo Teshima, Osaka (JP)

(73) Assignees: SUZUKI MOTOR CORPORATION (JP); Teijin Limited (JP)

( * ) Notice: Subject to any disclaimer, the term of this patent is extended or adjusted under 35 U.S.C. 154(b) by 0 days.

(21) Appl. No.: 16/146,310

(22) Filed: Sep. 28, 2018

(65) Prior Publication Data
US 2019/0100264 A1    Apr. 4, 2019

(30) Foreign Application Priority Data
Oct. 2, 2017    (JP) .................. 2017-192792

(51) Int. Cl.
*B62J 1/02*    (2006.01)
*B62K 11/02*    (2006.01)
(Continued)

(52) U.S. Cl.
CPC .................. *B62J 1/08* (2013.01); *B62K 11/02* (2013.01); *B62K 19/02* (2013.01); *B62K 19/16* (2013.01);
(Continued)

(58) Field of Classification Search
None
See application file for complete search history.

(56) References Cited

U.S. PATENT DOCUMENTS 5,909,819 A *  6/1999  Adachi .................. B29C 45/00
                                                           220/623
9,902,458 B2   2/2018  Matsushima
(Continued)

FOREIGN PATENT DOCUMENTS

CN    106379251 A  *  2/2017
DE    4224120 A1  *  1/1994  ............. B62K 11/02
(Continued)

OTHER PUBLICATIONS

Machine Translation of JP-10088501-A, dated Apr. 1998 (Year: 1998).*
(Continued)

*Primary Examiner* — Jeffrey A Vonch
(74) *Attorney, Agent, or Firm* — Lerner, David, Littenberg, Krumholz & Mentlik, LLP

(57) ABSTRACT

In the vicinity of a front end of a plate-shaped member of a fiber reinforced resin material having long fibers, to suppress deterioration in strength due to waviness of the long fibers during press-molding. The plate-shaped member is formed by a discontinuous fiber reinforced resin having long fibers. A flat surface part of the plate-shaped member is provided with a hole part, and a side wall is integrally formed to a semicircular end of the flat surface part located closer to the hole part. The side wall is arranged in a region between an opening edge of the hole part closer to a front end, and the front end so as to extend around its outer circumference.

7 Claims, 4 Drawing Sheets

(51) Int. Cl.
    *B62K 19/02*     (2006.01)
    *B62K 19/18*     (2006.01)
    *B62J 1/08*     (2006.01)
    *B62K 19/16*     (2006.01)
    *B29D 99/00*     (2010.01)
    *B62K 19/24*     (2006.01)
    *B62K 19/30*     (2006.01)

(52) U.S. Cl.
    CPC .......... *B29D 99/0014* (2013.01); *B62K 19/18* (2013.01); *B62K 19/24* (2013.01); *B62K 19/30* (2013.01)

(56) References Cited

U.S. PATENT DOCUMENTS

| | | | |
|---|---|---|---|
| 2007/0243343 A1* | 10/2007 | Imaizumi | B29C 45/0005 428/31 |
| 2008/0277980 A1* | 11/2008 | Koda | B62K 19/30 297/215.16 |
| 2009/0021059 A1* | 1/2009 | Suzuki | B62K 11/04 297/195.1 |
| 2010/0239856 A1* | 9/2010 | Olson | B29C 70/465 428/339 |
| 2011/0147561 A1* | 6/2011 | Koda | B62K 19/12 248/429 |
| 2013/0043668 A1* | 2/2013 | Allred, III | B62J 25/00 280/291 |
| 2013/0278025 A1* | 10/2013 | Wakabayashi | B62K 11/04 297/195.1 |
| 2013/0344282 A1* | 12/2013 | Yagi | B29C 70/10 428/113 |
| 2015/0050453 A1* | 2/2015 | Carson, Jr. | B29C 66/547 428/134 |
| 2015/0060177 A1* | 3/2015 | Matsushima | B62K 19/16 180/219 |
| 2016/0200387 A1* | 7/2016 | Matsushima | B62K 11/04 180/219 |
| 2016/0288851 A1* | 10/2016 | Tada | B62K 11/00 |
| 2018/0072368 A1* | 3/2018 | Matsuo | B62J 1/08 |
| 2018/0339739 A1* | 11/2018 | Kondo | B62J 1/08 |
| 2019/0009851 A1* | 1/2019 | Ohara | B62J 15/00 |

FOREIGN PATENT DOCUMENTS

| | | | | |
|---|---|---|---|---|
| DE | 102010048256 A1 | * | 4/2012 | ............ B66F 9/22 |
| DE | 102013214109 A1 | * | 1/2015 | ............ B62K 11/02 |
| EP | 1550605 A1 | * | 7/2005 | ............ B62K 19/12 |
| EP | 1695898 A1 | * | 8/2006 | ............ B62K 11/04 |
| EP | 1972421 A1 | * | 9/2008 | |
| JP | 58049581 A | * | 3/1983 | ............ B62J 1/08 |
| JP | 63082894 A | * | 4/1988 | ............ B62K 11/02 |
| JP | 07215256 A | * | 8/1995 | ............ B62K 11/02 |
| JP | 09150770 A | * | 6/1997 | |
| JP | 10088501 A | * | 4/1998 | |
| JP | 2001213377 A | * | 8/2001 | ............ B22D 17/00 |
| JP | 2004106609 A | * | 4/2004 | ............ B22D 17/00 |
| JP | 2006232166 A | * | 9/2006 | ............ B62K 19/12 |
| JP | 2015131584 A | | 7/2015 | |
| JP | 2015186979 A | * | 10/2015 | |
| WO | 2011095399 A1 | | 8/2011 | |
| WO | 2015033425 A1 | | 3/2015 | |

OTHER PUBLICATIONS

Machine Translation of DE-102010048256-A1, dated Apr. 2012 (Year: 2012).*
Preliminary Search Report including Written Opinion for Application No. FR1858921, dated Mar. 27, 2020, pp. 1-8.

* cited by examiner

FIBER REINFORCED RESIN MATERIAL PLATE-SHAPED MEMBER

CROSS-REFERENCE TO RELATED APPLICATIONS

This application claims the benefit of the filing date of Japanese Patent Application No. 2017-192792, filed on Oct. 2, 2017, the disclosure of which is hereby incorporated herein by reference.

TECHNICAL FIELD

The present invention relates to a plate-shaped member formed of a fiber reinforced resin.

BACKGROUND ART

For example, as disclosed in WO 2015/033425 A1, there is known a structure in which a rear frame supporting a riding seat in a saddle type two-wheel vehicle is formed using a fiber reinforced resin having long fibers so as to attain reduction in weight of the rear frame while maintaining strength. Long fibers are fibers having a length of 10 mm or more, for example, and a fiber reinforced resin having long fibers cannot be normally formed through injection-molding, but is formed through press-molding, for example.

In the structure of the rear frame disclosed in WO 2015/033425 A1, right and left side wall panels made of a fiber reinforced resin are fastened by cross members, and are bolt-fastened to a main frame via fastening holes provided to the side wall panels made of the fiber reinforced resin.

SUMMARY OF THE INVENTION

Problems to be Solved by the Invention

If a plate-shaped member is formed, for example, using a discontinuous fiber reinforced resin having long fibers, and through press-molding, in ends of the plate-shaped member during the press-molding, when the resin and the long fibers flow together and abut to a die at positions corresponding to the ends, the long fibers cannot escape, so that wavy warping of the long fibers might occur. The waviness herein denotes a phenomenon in which the long fibers do not flow in layers, but flow in the manner of a turbulent flow.

In the portions where waviness of the long fibers occurs, a resin surface including no long fibers might be exposed to the surface layer of the plate-shaped member. Such portions experience deterioration in strength. If the hole part for fastening bolts or the like is provided near the front end of the plate-shaped member, there might be generated, around the hole part, a part in which a predetermined strength cannot be secured.

If the side wall panels disclosed in WO 2015/033425 A1 is produced by using a discontinuous fiber reinforced resin, and through press-molding, waviness of the long fibers occurs around a fastening hole formed at an end portion of the product, which might result in deterioration in strength.

The present invention has been made in order to solve the above problems, and an object thereof is to provide a plate-shaped member of a fiber reinforced resin having long fibers capable of suppressing deterioration in strength due to waviness of the long fibers in the vicinity of a front end of the plate-shaped member of the fiber reinforced resin material.

Means for Solving the Problems

In order to attain the above object, a plate-shaped member according to the present invention is formed by a fiber reinforced resin. In the plate-shaped member, the fiber reinforced resin is a discontinuous fiber reinforced resin having long fibers, a hole part is provided in a flat surface part of the plate-shaped member, a side wall is integrally formed at an outer peripheral end of the flat surface part located closer to the hole part, and the side wall is arranged so as to extend along an outer circumference of a region between a portion of an opening edge of the hole part, the portion located closer to the outer peripheral end, and the outer peripheral end.

Advantageous Effect of the Invention

According to the present invention, it is possible to suppress deterioration in strength due to waviness of long fibers, in the vicinity of the front end of the plate-shaped member formed of the fiber reinforced resin material having long fibers.

DETAILED DESCRIPTION

Mode for Carrying Out the Invention

Hereinafter, a plate-shaped member 1 of a fiber reinforced resin material according to the present invention will be described with reference to drawings (FIGS. 1 to 9).

First Embodiment

Figure 1:
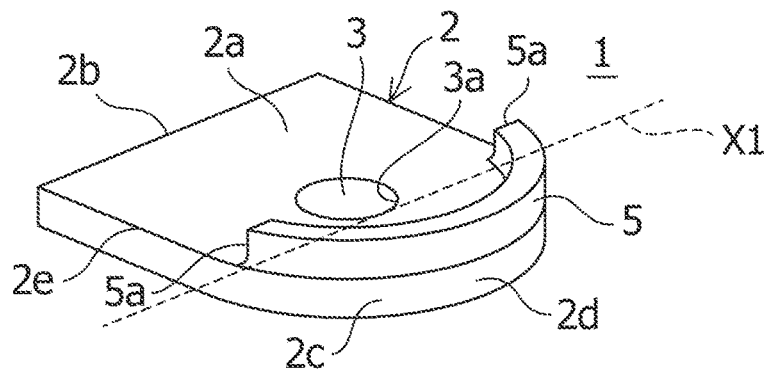
FIG. 1 is a perspective view showing a first embodiment of a plate-shaped member of a fiber reinforced resin material according to the present invention.

First, the first embodiment that is a basic configuration of the plate-shaped member of the fiber reinforced resin material according to the present invention will be described using FIG. 1. FIG. 1 is a perspective view showing the first embodiment of the plate-shaped member 1.

Description will be started with the material of the plate-shaped member 1 of the present embodiment. The plate-shaped member 1 of the present embodiment is formed by a discontinuous fiber reinforced resin material having long fibers. The resin material used in the present embodiment is a carbon fiber reinforced resin CFRP (Carbon Fiber Reinforced Plastics) using a thermosetting resin as a base member, or a carbon fiber reinforced resin having a thermoplastic CFRTP (Carbon Fiber Reinforced Thermo Plastics).

As the fibers used in the fiber reinforced resin, various types of fibers may be used, such as carbon fibers, glass fibers, polyamide fibers, and polyethylene fibers. The fiber reinforced resin includes a continuous fiber reinforced resin and a discontinuous fiber reinforced resin. The continuous fiber reinforced resin denotes a resin obtained by arranging continuous carbon fibers in one direction and impregnating the arranged carbon fibers with resin, for example. This continuous fiber reinforced resin has a higher mechanical property (such as rigidity) in a direction in which the carbon fibers are orientated, but has a lower mechanical property in a direction orthogonal to the direction in which the carbon fibers are orientated.

On the other hand, the discontinuous fiber reinforced resin denotes a resin obtained by impregnating discontinuous fibers having certain lengths with resin, for example. In such a discontinuous fiber reinforced resin, each carbon fiber has a different orientation, and thus the fibers have no directivity depending on the degree of a mechanical property. The discontinuous fiber reinforced resin can be more easily molded than the continuous fiber resin is.

Hereinafter, the shape of the plate-shaped member 1 formed by a discontinuous fiber reinforced resin will be described using FIG. 1. As shown in FIG. 1, the plate-shaped member 1 includes a flat surface part 2, a hole part 3, and a side wall 5. The flat surface part 2 is formed in a flat plate-shaped shape having a main surface 2a with a predetermined area. In the present embodiment, the flat surface part 2 is a flat plate extending in one direction (right-left direction in FIG. 1). One end (left end in FIG. 1) in the longer direction of the flat surface part 2 is a straight end 2b linearly extending so as to be orthogonal to the longer direction. The other end (right end in FIG. 1) in the longer direction is a semicircular end 2c. That is, the rectangular shape of the plate-shaped member 1 has one end formed in a semicircular shape.

The hole part 3 is provided near an outer peripheral end of the flat surface part 2. In the present embodiment, the outer peripheral end located near the hole part 3 is the semicircular end 2c. A front end 2d of the flat surface part 2 in this example is located at the semicircular end 2c at the center in the width direction of the flat surface part 2. The hole part 3 is a through hole in a circular shape, and the center of the hole part 3 is located at a position with a predetermined distance from the front end 2d of the semicircular end 2c. This center is located at the center in the width direction of the plate-shaped member 1.

The distance between the center of the hole part 3 and the front end 2d of the semicircular end 2c is shorter than the distance between the center of the hole part 3 and the straight end 2b. That is, as aforementioned, the end near the hole part 3 (end located near the hole part 3) in the present embodiment is the semicircular end 2c.

The side wall 5 is provided at an end of the flat surface part 2, and are so arranged as to project in a generally vertical direction from the flat surface part 2 to the one side (upper side in FIG. 1), and extend along the outer circumference of the flat surface part 2. The side wall 5 is provided at the outer peripheral end of the flat surface part 2, located in a region between an opening edge 3a of the hole part 3 closer (right in FIG. 1) to the front end 2d, and the front end 2d so as to extend along its outer circumference.

In this example, the side wall 5 is disposed along substantially the entire semicircular end 2c, and an end 5a of the side wall 5 is disposed at an end 2e in the width direction of the flat surface part 2 corresponding to the opening edge 3a of the hole part 3, the opening edge located closer (right in FIG. 1) to the front end 2d. That is, as shown in FIG. 1, the end 5a of the side wall 5 is disposed to a broken line X1 in the width direction passing through the opening edge 3a located closer to the front end 2d. The length from the flat surface part 2 to the top of the side wall 5 that is the height of the side wall 5 may be any length as far as this length is longer than the plate thickness of the flat surface part 2. In addition, the side wall 5 and the main surface 2a are connected to each other by an R part having a predetermined curvature. The R part suppresses stress concentration to the corner part composed by the side wall 5 and the main surface 2a.

The plate-shaped member 1 in the present embodiment is formed by press-molding the discontinuous fiber reinforced resin material. When raw materials of the plate-shaped member 1 are press-molded, long fibers of the front end 2d of the plate-shaped member 1 can be led to the side wall 5. Since the resin is led to the side wall 5 without being stagnant at the front end 2d, it is possible to suppress occurrence of waviness of long fibers in the vicinity of the front end 2d. Hence, it is possible to suppress deterioration in strength due to waviness of the long fibers in the vicinity of the front end 2d.

The side wall 5 has an effect as a rib, and can enhance strength around the semicircular end 2c located closer to the hole part 3. As a result, also in the case in which the hole part 3 for fastening a bolt or the like is provided in the vicinity of the front end 2d, it is possible to secure the strength around the hole part 3.

Figure 2:
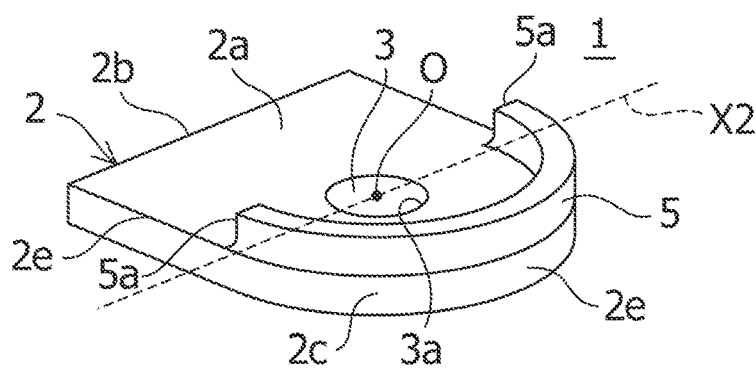
FIG. 2 is a perspective view showing a first variation of FIG. 1.

As shown in FIG. 2, the side wall 5 may be disposed at the outer peripheral end of the flat surface part 2 located in the region between the center position O of the hole part 3 and the front end 2d. The end 5a of the side wall 5 in this case is disposed at the end 2e in the width direction corresponding to the center position O of the hole part 3. That is, as shown in FIG. 2, the end 5a of the side wall 5 is disposed to a broken line X2 in the width direction passing through the center position O of the hole part 3.

Figure 3:
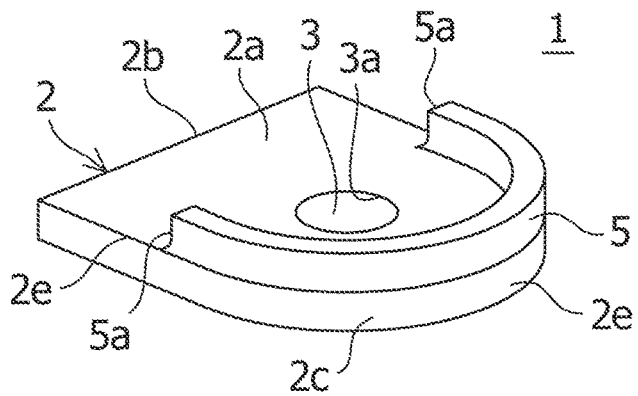
FIG. 3 is a perspective view showing a second variation of FIG. 1.

As shown in FIG. 3, the side wall 5 may be disposed at the outer peripheral end of the flat surface part 2 located in a region between the opening edge 3a of the hole part 3 opposite to the front end 2d (on the straight end 2b side), and the front end 2d. The end 5a of the side wall 5 in this case is disposed at the end 2e in the width direction corresponding to the opening edge 3a of the hole part 3 located closer to the straight end 2b. Although its illustration is omitted, the end 5a of the side wall 5 may be disposed at a position further closer to the straight end 2b.

In this manner, by providing the side wall 5, occurrence of waviness of the longer fibers around the hole part 3 and in the vicinity of the front end 2d is further suppressed; therefore, the suppression effect to suppress deterioration in strength due to the above occurrence of waviness around the hole part 3 is further enhanced.

Second Embodiment

Figure 4:
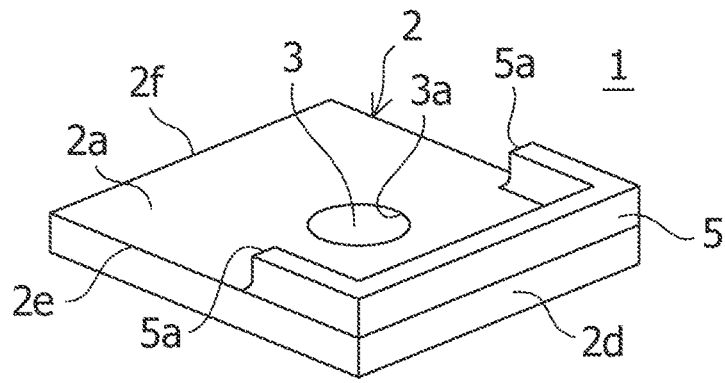
FIG. 4 is a perspective view showing a second embodiment of the plate-shaped member of the fiber reinforced resin material according to the present invention.

Subsequently, the second embodiment as the basic configuration of the plate-shaped member of the fiber reinforced resin material according to the present invention will be described using FIG. 4. FIG. 4 is a perspective view of the plate-shaped member 1 of the present embodiment. The present embodiment is a variation of the first embodiment (FIG. 1), and the same components or similar components as those of the first embodiment are denoted by the same reference numerals, and duplicate description will be omitted.

The flat surface part 2 of the present embodiment is in a rectangular shape, and the right and left direction of FIG. 4 corresponds to the longer direction. Both ends in the longer direction of the flat surface part 2 extend straight so as to be orthogonal to the longer direction.

As with the first embodiment, the hole part 3 is provided at a position with a predetermined distance from the front end 2*d* on the right in FIG. 4 of the flat surface part 2. The front end 2*d* of the flat surface part 2 in this example is the end in the longer direction on the right in FIG. 4. The center of the hole part 3 is located at the center in the width direction of the plate-shaped member 1. The distance between the center of the hole part 3 and the front end 2*d* is shorter than the distance between the center of the hole part 3 and the end in the longer direction on the left in FIG. 4.

As with the first embodiment, the side wall 5 is provided at the outer peripheral end of the flat surface part 2, and is arranged at the outer peripheral end of the flat surface part 2 located in a region between an opening edge 3*a* of the hole part 3 (right in FIG. 4) closer to the front end 2*d*, and the front end 2*d* so as to extend along its outer circumference. In this example, the side wall 5 is disposed at an end 2*f* in the longer direction on the right in FIG. 4, and at ends 2*e* in the width direction continuously extending from both ends of the end 2*f* in the longer direction. The side wall 5 located at the ends 2*e* in the width direction extends from the end 2*f* in the longer direction to the respective ends 2*e* in the width direction of the flat surface part 2, corresponding to the opening edge 3*a* of the hole part 3 closer to the front end 2*d*.

Configured in this manner, it is possible to attain the same effect as that of the first embodiment. In addition, as with the first embodiment, the side wall 5 of the present embodiment may be disposed at the outer peripheral end of the flat surface part 2, located in a region between the center position of the hole part 3 and the front end 2*d*, or may be disposed at the outer peripheral end of the flat surface part 2, located in a region between the opening edge 3*a* of the hole part 3 on the opposite side to the front end 2*d* (on the straight end 2*b* side), and the front end 2*d*. The ends 5*a* of the side wall 5 may be disposed at positions further closer to the straight end 2*b*.

Third Embodiment

Subsequently, the third embodiment of the plate-shaped member of the fiber reinforced resin material according to the present invention will be described using FIGS. 5 to 7. In the present embodiment, there will be described such an example that uses the configuration of the plate-shaped member 1 described in the first embodiment in seat rails 11 mounted to a main frame 10 of a saddle type two-wheel vehicle, for example.

The seat rails 11 are frame members used for mounting a seat member of a saddle type vehicle to a vehicle body, and compose a vehicle framework. As show in FIG. 5, the seat rails 11 in the present embodiment are disposed in pair with a distance in the vehicle width direction therebetween, and extend in the vehicle longitudinal direction. The seat rails 11 are gradually inclined in the vehicle upward direction as the seat rails 11 extend in the vehicle rearward direction.

Here, the configuration of each seat rail 11 will be described. The seat rail 11 includes a flat surface part 12 and a side wall 15, and the flat surface part 12 is a part in a plate-shaped shape having a surface facing the vehicle width direction, and extends in the vehicle longitudinal direction. In this example, as shown in FIG. 5, the flat surface part 12 is disposed to be gradually inclined in the vehicle upward direction as the flat surface part 12 extends toward the vehicle rearward direction.

A main surface 12*a* of the flat surface part 12, facing the vehicle width direction, has a lower portion of the main surface 12*a* that swells outward in the vehicle width direction. An upper front portion of the main surface 12*a* is provided with a fastening portion 13 used for joining the seat rail 11 to the main frame 10 of the saddle type vehicle with a bolt (fastening member) 19 or the like. The hole part 3 (FIG. 1) described in the first embodiment is configured as the fastening portion 13 in the present embodiment. Two fastening portions 13 in the present embodiment are provided on each side of the both (right and left) sides in the vehicle width direction. The two fastening portions 13 on one side in the vehicle width direction are arranged with a distance in the vehicle vertical direction therebetween.

Figure 5:
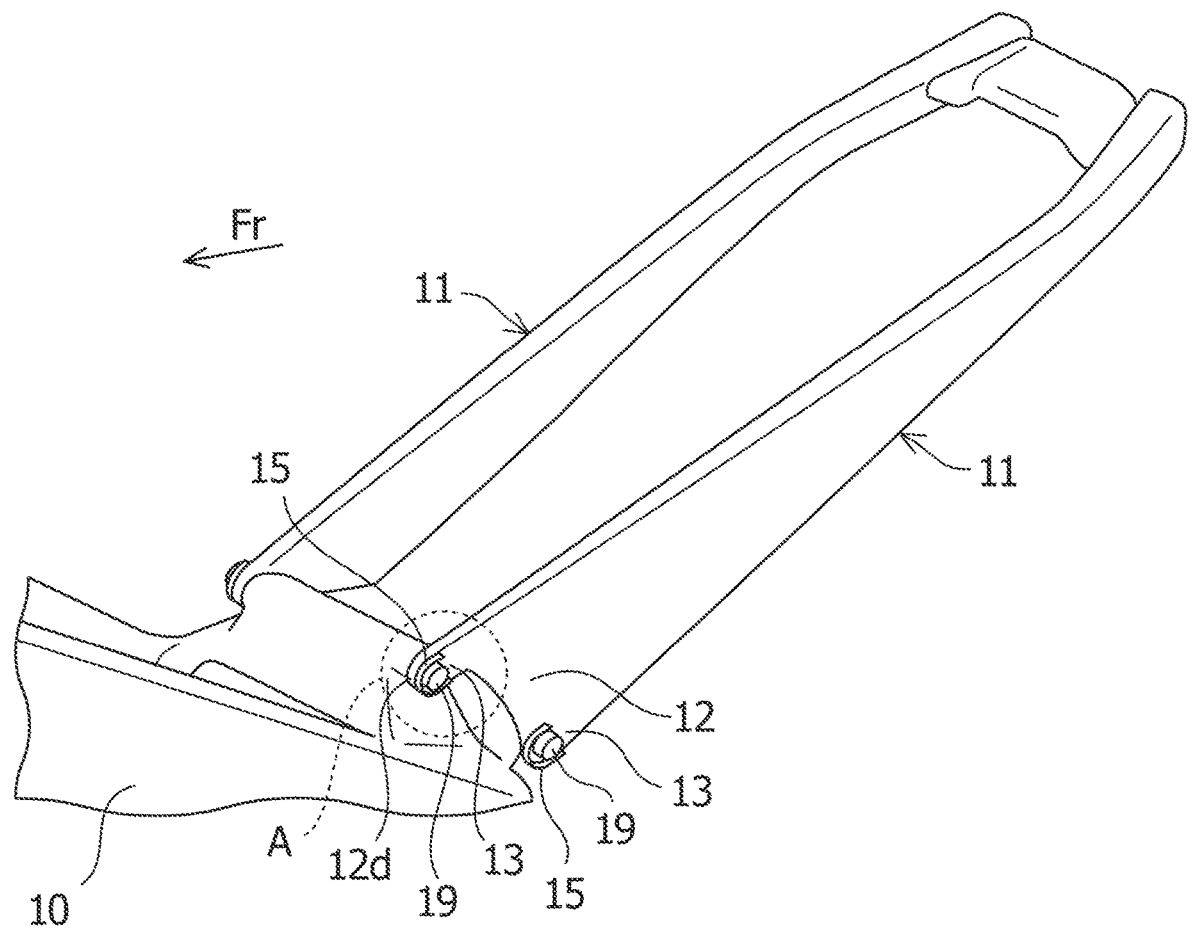
FIG. 5 is a perspective view showing a third embodiment of the plate-shaped member of the fiber reinforced resin material according to the present invention.
Figure 6:
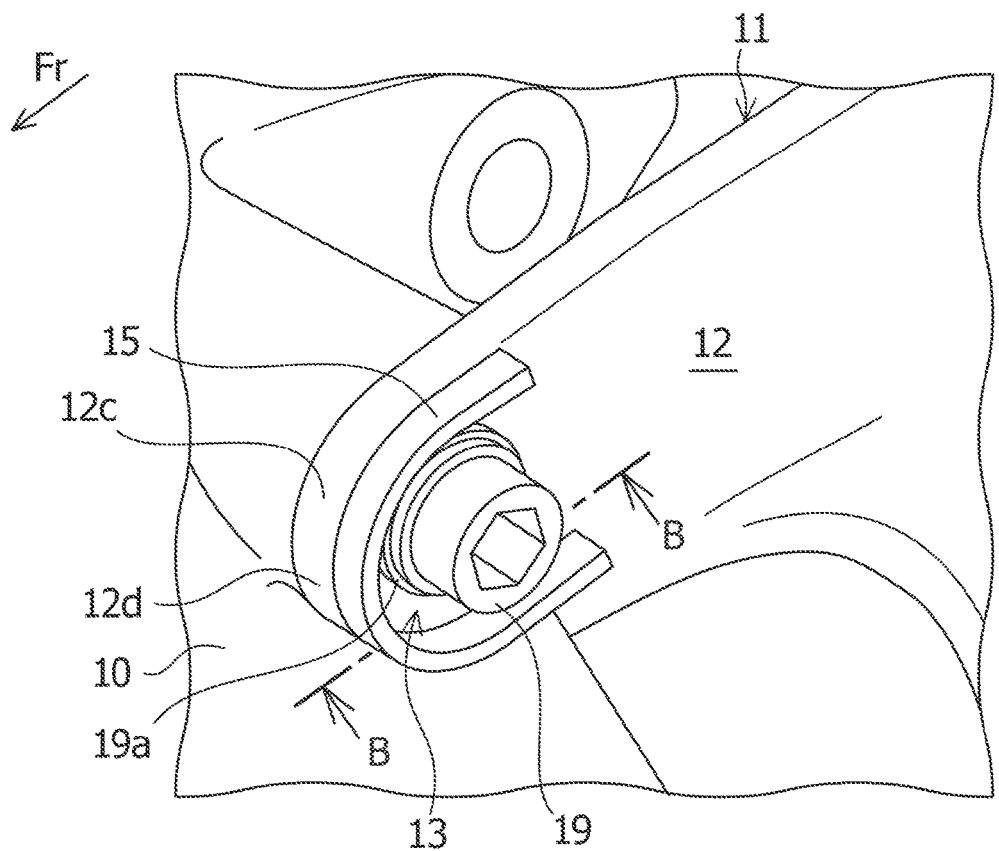
FIG. 6 is an enlarged view showing a part A of FIG. 5 magnified.
Figure 7:
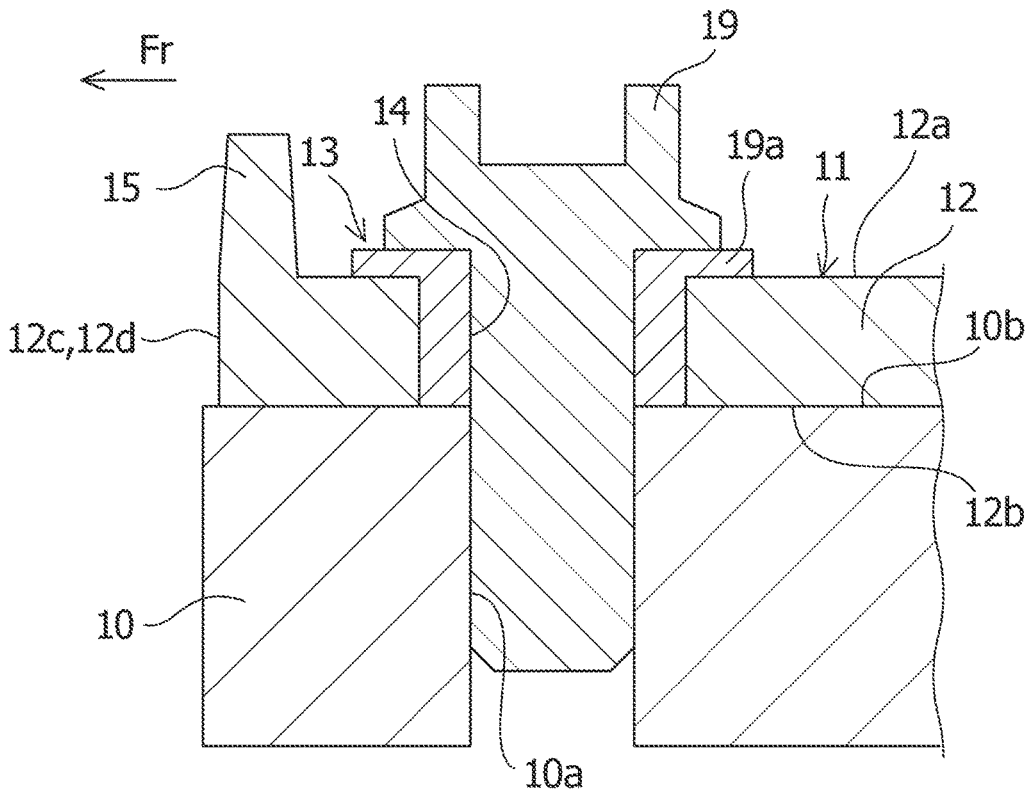
FIG. 7 is a sectional view taken along line B-B of FIG. 6.

As shown in FIGS. 5 to 7, the upper fastening portion 13 is provided at a front end portion of a front part having a smaller width in the vertical direction of the flat surface part 12, and has a through hole 14 in a circular shape extending through the flat surface part 12 in the vehicle width direction. The through hole 14 is provided at a position with a predetermined distance in the vehicle rearward direction from a front end 12*d* in the front part of the flat surface part 12. As shown in FIG. 6, as with the first embodiment, the front end 12*d* of the flat surface part 12 in this example is a front end of a semicircular end 12*c*, and is located at a generally center position in the width of the vehicle vertical direction of the flat surface part 12 in the semicircular end 12*c*.

The center of the through hole 14 is disposed at a more vehicle-rearward position with a predetermined distance than the front end 12*d* of the semicircular end 12*c*. This center may be located at a center in the width of the vehicle vertical direction of the flat surface part 12, or may be located at a position upwardly or downwardly shifting from this center.

The lower fastening portion 13 is disposed to the lower corner of the seat rail 11, and is formed in the same manner as that of the upper fastening portion 13.

The side wall 15 is provided at the outer peripheral end of the front part of the flat surface part 12, and projects outward in the vehicle width direction from the main surface 12*a* of the flat surface part 12 in the generally vertical direction so as to extend along the outer peripheral end. The side wall 15 is arranged at the outer peripheral end located in a region between the opening edge 3*a* at a front position of the through hole 14, and the front end 12*d* so as to extend along its outer circumference. In this example, the side wall 15 is arranged along substantially the entire range of the semicircular end 12*c*, and further extends more vehicle-rearward than the hole part 3.

Here, the state in which the fastening portion 13 is fastened to the lateral surface of the main frame 10 will be described. As shown in FIG. 6, a bolt hole 10*a* communicating with the through hole 14 of the fastening portion 13 is formed in the lateral surface 10*b* of the main frame 10. A contact surface 12*g* in the front part of the flat surface part 12 is brought to come in contact with the lateral surface 10*b* of the main frame 10 such that the through hole 14 of the fastening portion 13 communicates with the bolt hole 10*a*. In this state, the bolt 19 is inserted into the through hole 14 through a bush 19a to be screwed into the bolt hole 10a, and the seat rail 11 is thereby fastened to the lateral surface 10b of the main frame 10.

When a load is applied to the rear part of the seat rail 11, the load is transmitted to the fastening portion 13 fastening the seat rail 11 to the main frame 10. Meanwhile, during press-molding the seat rail 11, if waviness of the long fibers occurs in the fastening portion 13, the strength of the fastening portion 13 might be deteriorated. If the strength of the fastening portion 13 is deteriorated due to this waviness, the load transmitted to the fastening portion 13 might cause breakage to the fastening portion 13. Hence, there has been a problem in that the fastening portion 13 cannot be provided to the end of the seat rail 11. This lowers flexibility in design.

In contrast, as with the present embodiment, by using the plate-shaped member 1 described in the first embodiment in the seat rail 11, during press-molding the seat rail 11, the long fibers located around the through hole 14 of the fastening portion 13 can be led to the side wall 15. The resin can be led to the side wall 15 without being stuck at the fastening portion 13; therefore, it is possible to suppress occurrence of the waviness of the long fibers in the vicinity of the fastening portion 13. Accordingly, it is possible to suppress deterioration in strength due to the waviness of the long fibers at the fastening portion 13. In addition, since the side wall 15 functions as a rib, rigidity of the fastening portion 13 can be further enhanced.

As a result, even when load is applied to the rear part of the main frame 10, the fastening portion 13 fastening the seat rail 11 to the main frame 10 is suppressed from being broken due to the above waviness of the long fibers, and thus, it is possible to suppress breakage of the fastening portion 13 even when the load is applied to the fastening portion 13.

Accordingly, even if using the fiber reinforced resin material that is a discontinuous fiber reinforced resin having long fibers, it is possible to provide the fastening portion 13 to the front part of the seat rail 11, to thus bring the seat rail 11 to be a mounting component to the main frame 10.

Fourth Embodiment

Subsequently, the fourth embodiment of the plate-shaped member of the fiber reinforced resin material according to the present invention will be described using FIGS. 8 and 9. The present embodiment is a variation of the third embodiment (FIGS. 5 to 7), and the same components or similar components as those of the third embodiment are denoted by the same reference numerals, and duplicate description will be omitted.

Figure 8:
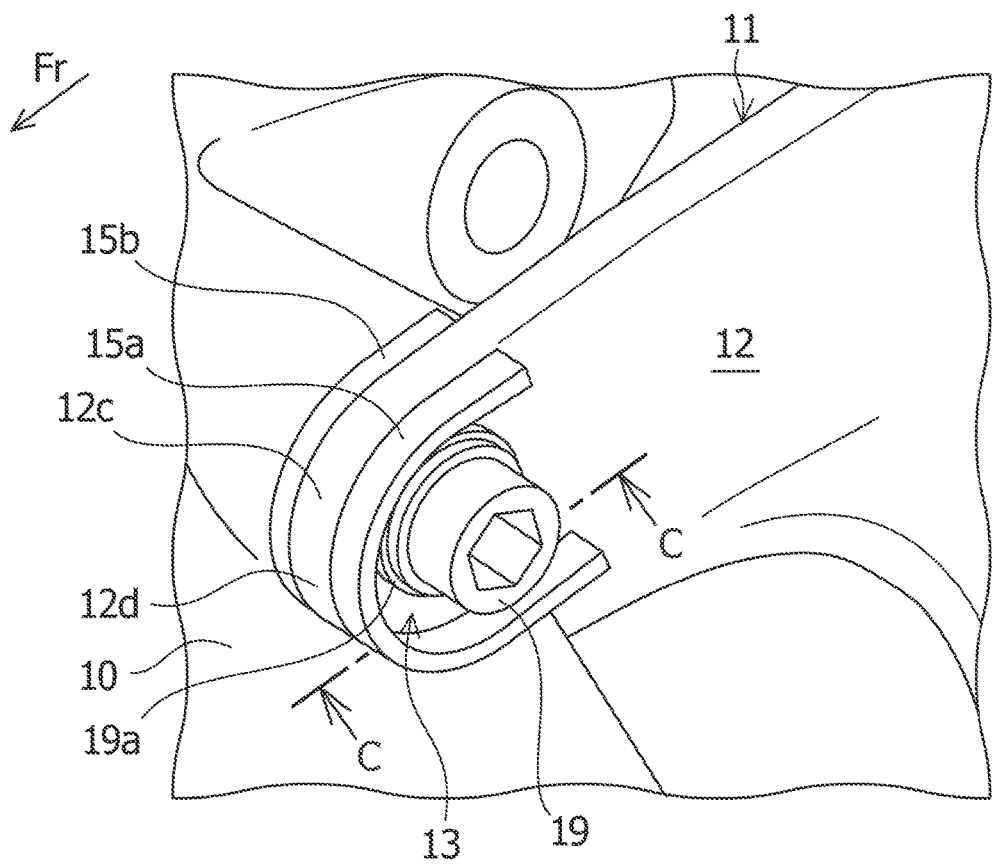
FIG. 8 is a perspective view showing a fourth embodiment of the plate-shaped member of the fiber reinforced resin material according to the present invention. This is a perspective view showing a variation of FIG. 6.
Figure 9:
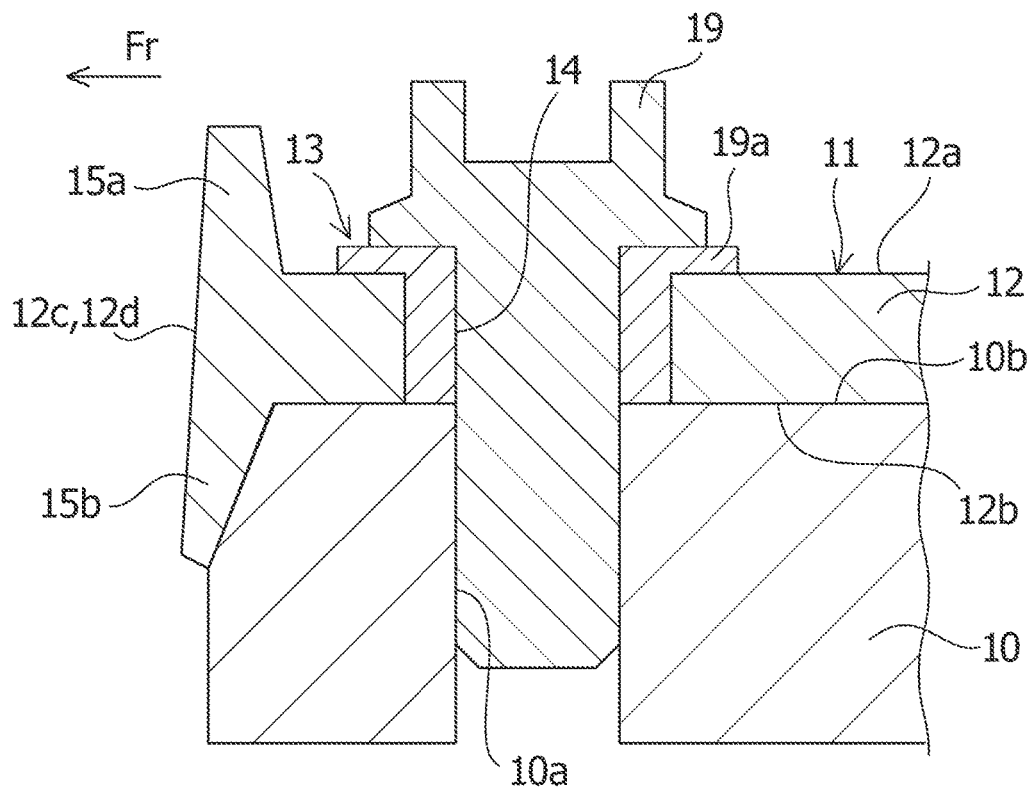
FIG. 9 is a sectional view taken along line C-C of FIG. 8.

As shown in FIGS. 8 and 9, in the seat rail 11 of the present embodiment, side walls 15a, 15b are provided on both surfaces of the flat surface part 12. That is, the seat rail 11 of the present embodiment includes an outer side wall 15a projecting outward in the vehicle width direction from the main surface 12a of the flat surface part 12, and an inner side wall 15b projecting inward in the vehicle width direction from the main surface 12a. Since the outer side wall 15a and the inner side wall 15b are provided, it is possible to further enhance the effects of the first to the third embodiments.

The volumes of the side walls 15a, 15b in which the long fibers are introduced during the pressing-molding are increased more than that of the side wall 15 of the third embodiment; therefore, the long fibers more easily flow around the through hole 14 and in the front end 12d, to thereby suppress occurrence of waviness of the long fibers around the through hole 14; as a result, deterioration in strength of the fastening portion 13 can be suppressed.

As shown in FIG. 9, the inner side wall 15b is engaged with the main frame 10. For this reason, the inner side wall 15b is so inclined as to match the shape of the main frame 10. Therefore, the outer side wall 15a and the inner side wall 15b are not necessarily symmetric to each other. By being configured in this manner, the inner side wall 15b functions as a positioner when the seat rail 11 and the main frame 10 are joined to each other. Accordingly, by providing the inner side wall 15b, it is possible to reduce time required for mounting the seat rail 11 to the main frame 10.

The above descriptions of the first to the fourth embodiments are examples used for explaining the present invention, and are not intended to limit the invention as set forth in the claims. The configurations of the respective components of the present invention are not limited to those of the above embodiments, and various modifications may be possible within the technical scope as set forth in the claims.

For example, the hole part 3 of the first and the second embodiments may be a through hole or a bottomed hole. In the case of employing a bottomed hole, this hole may be formed as a bolt hole into which a bolt is screwed, and a through hole may be provided to a member to be fasted to the plate-shaped member 1. In the third embodiment, the plate-shaped member 1 of the first embodiment is used in the seat rail 11, but the present invention is not limited to this. The plate-shaped member 1 described in the second embodiment may be used in the seat rail 11.

The plate-shaped member 1 in the first and the second embodiments may be applicable to a member other than the seat rail as far as this plate-shaped member is formed by a discontinuous fiber reinforced resin having long fibers. In the third and the fourth embodiments, there has been described an example of using the plate-shaped member 1 formed by a thermo-plastic CFRP described in the first embodiment, in the seat rail 11 mounted to the main frame 10 of a saddle type two-wheel vehicle, but the present invention is not limited to this. For example, the thermoplastic CFRP may be used in a stack frame corresponding to a floor part of an automobile, or the like.

REFERENCE SIGNS LIST 1 plate-shaped member
2 flat surface part
2a main surface
2b straight end
2c semicircular end
2d front end
2e end in the width direction
3 hole part
3a opening edge
5 side wall
10 main frame
10a bolt hole
10b lateral surface
11 seat rail
12 flat surface part
12c semicircular end
12d front end
12g contact surface
13 fastening portion
14 through hole
15 side wall
15a outer side wall
15b inner side wall

19 bolt (fastening member)
19*a* bush

The invention claimed is:

1. A seat rail for a saddle type vehicle, the seat rail being mounted to a main frame of the saddle type vehicle and being formed of a discontinuous fiber reinforced resin having long fibers,
   wherein the seat rail is inclined in a vehicle upward direction as it extends in a vehicle rearward direction, the seat rail having a flat surface part oriented in a vehicle width direction having a side facing the vehicle and an opposing side facing away from the vehicle and formed of the discontinuous fiber reinforced resin,
   wherein a fastening portion used for fastening the seat rail to the main frame by a fastening member is provided on at least a front portion of the flat surface part, the fastening portion being provided with a hole into which the fastening member is inserted, and
   wherein a side wall is integrally formed with the flat surface part and is located close to but not contacting the hole, the side wall protruding from the flat surface part in the vehicle width direction on the opposing side away from the vehicle, the side wall being disposed between an inner edge of the hole and an outer periphery of the flat surface part, the side wall extending continuously around at least a part of the hole from a vehicle upper side of the hole, around a vehicle front side of the hole, and to a vehicle lower side of the hole.

2. The seat rail according to claim 1, wherein the side wall also protrudes from the flat surface part in the vehicle width direction on the side facing the vehicle.

3. The seat rail according to claim 1, wherein the front portion of the flat surface part comprises a second fastening portion.

4. The seat rail according to claim 1, wherein the side wall extending continuously around at least a part of the hole from a vehicle upper side of the hole, around a vehicle front side of the hole, and to a vehicle lower side of the hole defines a semi-circular or rectangular shape having two ends.

5. The seat rail according to claim 4, wherein the two ends are connected to the flat surface part with a portion comprising a predetermined curvature.

6. The seat rail according to claim 4, wherein the two ends form an imaginary line extending between them that intersects the hole.

7. The seat rail according to claim 6, wherein the imaginary line that intersects the hole passes through a center of the hole.

* * * * *